United States Patent [19]
Ido et al.

[11] Patent Number: 5,683,099
[45] Date of Patent: Nov. 4, 1997

[54] AIR BAG DEVICE

[75] Inventors: Masaru Ido; Yuji Kuriyama, both of Gifu; Hiroshi Yasuda; Takumi Narita, both of Aichi, all of Japan

[73] Assignee: Toyoda Gosei Co., Ltd., Aichi, Japan

[21] Appl. No.: 617,599

[22] Filed: Mar. 19, 1996

[30] Foreign Application Priority Data

Mar. 28, 1995 [JP] Japan .................... 7-070145

[51] Int. Cl.⁶ ............................................ B60R 21/16
[52] U.S. Cl. ............................ 280/728.2; 280/731
[58] Field of Search .......................... 280/728.2, 731, 280/732, 743.1

[56] References Cited

U.S. PATENT DOCUMENTS

| | | | |
|---|---|---|---|
| 5,064,218 | 11/1991 | Hartmeyer | 280/728.2 |
| 5,259,641 | 11/1993 | Schenk et al. | 280/731 |
| 5,368,327 | 11/1994 | Shiraki et al. | 280/728.2 |
| 5,421,607 | 6/1995 | Gordon | 280/728.2 |
| 5,443,284 | 8/1995 | Strahl et al. | 280/728.2 |
| 5,501,484 | 3/1996 | Saderholm | 280/728.2 |

*Primary Examiner*—Kenneth R. Rice
*Attorney, Agent, or Firm*—Cushman Darby & Cushman IP Group Of Pillsbury Madison & Sutro LLP

[57] ABSTRACT

In the air bag device, a bag holder, a retainer, and an air bag can be assembled together into a united body by use of bolts and nuts which are provided so as to extend from a retainer formed from a metal plate. At a plurality of positions near a peripheral edge of an opening formed in the air bag, there are formed insertion holes. In the retainer, there are provided a plurality of securing projections which are inserted through associated insertion holes and into associated securing holes formed in the bag holder. Each of the securing projections is cut and raised from a main body of the retainer and has a semi-cylindrical shape with the peripheral wall thereof raised from the retainer and a semi-arc shaped outer peripheral surface of the peripheral wall faces the opening of the air bag.

5 Claims, 3 Drawing Sheets

AIR BAG DEVICE

BACKGROUND OF THE INVENTION

1. Field of the invention

The present invention relates to an air bag device to be mounted in a vehicle and, in particular, to an improved retainer which is used to mount an air bag onto a bag holder.

2. Description of Related Art

Conventionally, an air bag device includes a folded air bag, an inflator for supplying expansion gas to the air bag, and a bag holder for holding the air bag and the inflator. The structure for holding the air bag and the inflator on the bag holder uses an annular retainer which is disposed near the peripheral edge of an opening formed in the air bag.

In particular, in the conventional holding structure, to the lower surface of the retainer, there are fixed a plurality of downwardly projecting bolts as fixing means. These bolts are inserted through mounting holes respectively formed in the peripheral edge of an opening formed in the air bag, formed in the flange portion of the inflator and formed in the bag holder. Thereafter, the bolts are fastened by nuts, respectively.

In order to reduce the number of fixing means such as the bolts or the like for the retainer to thereby reduce the number of assembly man-hours as well as the assembling cost of the air bag device, there is proposed a structure which is disclosed in Japanese Utility Model Publication No. Hei. 3-76750.

That is, in the last-mentioned structure, instead of the given number of fixing means for the retainer, there are provided in the retainer a plurality of securing projections which respectively project toward the bag holder. The securing projections are respectively inserted through insertion holes formed in the peripheral edge of the opening of the air bag and securing holes formed in the bag holder.

In this structure, the securing projections provided in the retainer are securely engaged with the securing holes of the air bag to thereby be able to withstand a tensile force which is generated when the air bag is expanded and which acts outwardly in the radial direction about the opening of the air bag. With this structure, the function as the fixing means can be mainly limited to the function of assembling the inflator, bag holder, retainer and air bag into a united body, so that the number of the fixing means for the retainer can be reduced accordingly.

When the securing projections for securing the air bag are provided in the retainer, conventionally, since the retainer is made of a metal plate, a plurality of cylindrical securing projections each having a bottom are provided by a drawing operation (see FIGS. 1 and 6 in Japanese Utility Model Publication No. Hei. 3-76750). However, in this drawing operation, the machining energy that is necessary to draw or mold the securing projections in the retainer is large, which requires a large-sized press. Use of the large-sized press naturally increases the machining cost of the retainer and makes it difficult to obtain given dimensions and shapes including the flatness of the periphery of the securing projections. That is, there is much room for improvement in reducing the cost of manufacture. In particular, if the peripheral edge of the securing projection is undulated, then such undulated form has ill effects on the fastening force of a bolt serving as the fixing means for the retainer. Also, if the dimension and shape of the periphery of the securing projection are out of order, then the position of the bolt serving as the fixing means is out of order. Therefore, it is necessary to machine the retainer under the very strict precision control.

To avoid these undesirable problems, if the securing projection is formed in a flat plate shape by cutting and raising it from the main body of the retainer, then the machining energy can be reduced.

However, if the securing projection is formed in a flat plate shape, then, when the air bag is expanded, the edge (the corner of a surface which is shorn when pressed) of the securing projection is strongly pressed against the inner peripheral surface of the insertion hole of the air bag to thereby cause a crack to open in the inner peripheral surface of the insertion hole in the air bag, which is not desirable.

SUMMARY OF THE INVENTION

The present invention aims at eliminating the above-mentioned problems found in the conventional air bag device. Accordingly, it is an object of the invention to provide an air bag device which, even if a plurality of securing projections for securing the air bag are produced in the retainer by press working which requires a reduced amount of machining energy, can prevent the air bag securing projections from interfering with the air bag when the air bag is expanded, and can lower the manufacturing cost of the air bag device by reducing the energy for machining the retainer.

The present invention relates to an air bag device comprising: a bag holder having securing holes; an air bag having an opening, insertion holes respectively extending through the air bag near the peripheral edge of the opening; and a retainer having a plurality of securing projections, each of the securing projections respectively being inserted through the insertion holes and into securing holes and being formed in a semi-cylindrical shape with a peripheral wall thereof located on the center side of the opening by cutting and raising it from the retainer.

The above securing projections are formed in a main body of the retainer. The inner surface of a base portion of each of the securing projections on a side of the retainer main body is formed so as to have an arc surface in the section thereof extending in a projecting direction of the securing projection.

Under the above condition, diameters of the securing hole and insertion hole are larger than an outside diameter of the securing projection and a diameter of the base portion is larger than the diameters of the securing hole and insertion hole.

Further, edges of the peripheral wall are disposed at least 180° apart.

In the air bag device according to the invention, each of the securing projections is formed not by a drawing operation but, by cutting and raising it from the main body of the retainer. That is, the securing projection can be formed simply by machining or forming it from the retainer main body by use of a press which requires a reduced amount of machining energy, which can lower the manufacturing cost of the retainer and also can eliminate the possibility that the dimensions and shapes of the peripheries of the respective securing projections will be effected.

And, since each of the securing projections is formed in a semi-cylindrical shape with the peripheral wall thereof raised from the retainer and a semi-arc shaped outer peripheral surface of the peripheral wall faces the opening of the air bag, when the air bag is expanded, the semi-arc shaped outer peripheral surface of the peripheral wall of the securing projection comes into touch with the inner peripheral surfaces of the securing holes of the air bag to thereby prevent the edges of the securing projections from being brought into strong contact with the inner peripheral surfaces of the insertion holes of the air bag. This can in turn prevent cracks from opening in the inner peripheral surfaces of the insertion holes of the air bag.

Therefore, in the air bag device according to the invention, even if the securing projections are provided in the retainer and are produced by means of a press which requires a reduced amount of machining energy, when the air bag is expanded, the air bag is prevented from being interfered by the securing projections and further, the manufacturing cost of the retainer can be reduced by reducing the machining energy of the retainer.

Also, when the inner surface of the base portion of each of the securing projections on the retainer main body side is formed so as to have an arc-shaped section extending in the projecting direction of each of the securing projections, then the upper end of the inner peripheral surface of each of the insertion holes of the air bag touches the upper portion of the arc-shaped surface of the corresponding securing projection. This produces a gap between the portion of the insertion hole inner peripheral surface situated downwardly of the upper end thereof and the outer peripheral surface of the peripheral wall of the corresponding securing projection, which makes it difficult for the insertion hole inner peripheral surface portion situated downwardly of the upper end thereof to come into contact with the edge of the corresponding securing projection. This can further effectively prevent cracks from opening in the inner peripheral surfaces of the insertion holes of the air bag when the air bag is expanded.

DETAILED DESCRIPTION OF THE PRESENTLY PREFERRED EXEMPLARY EMBODIMENT

Now, description will be given below of an embodiment of an air bag device according to the invention with reference to the accompanying drawings.

Figure 1:
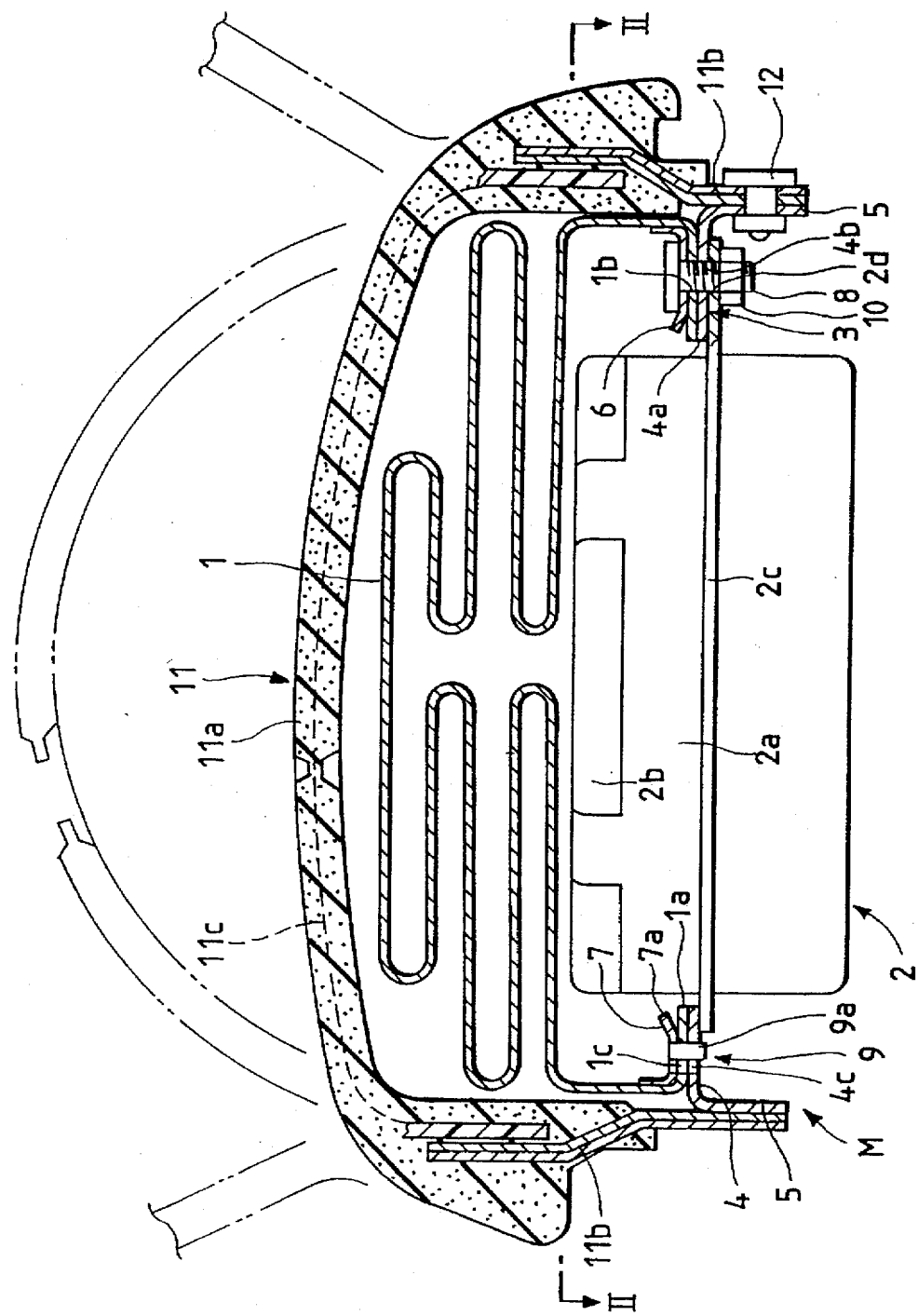
FIG. 1 is a partial longitudinal sectional view of an embodiment of an air bag device according to the invention, showing the portion thereof taken along the line I—I in FIG. 2.
Figure 2:
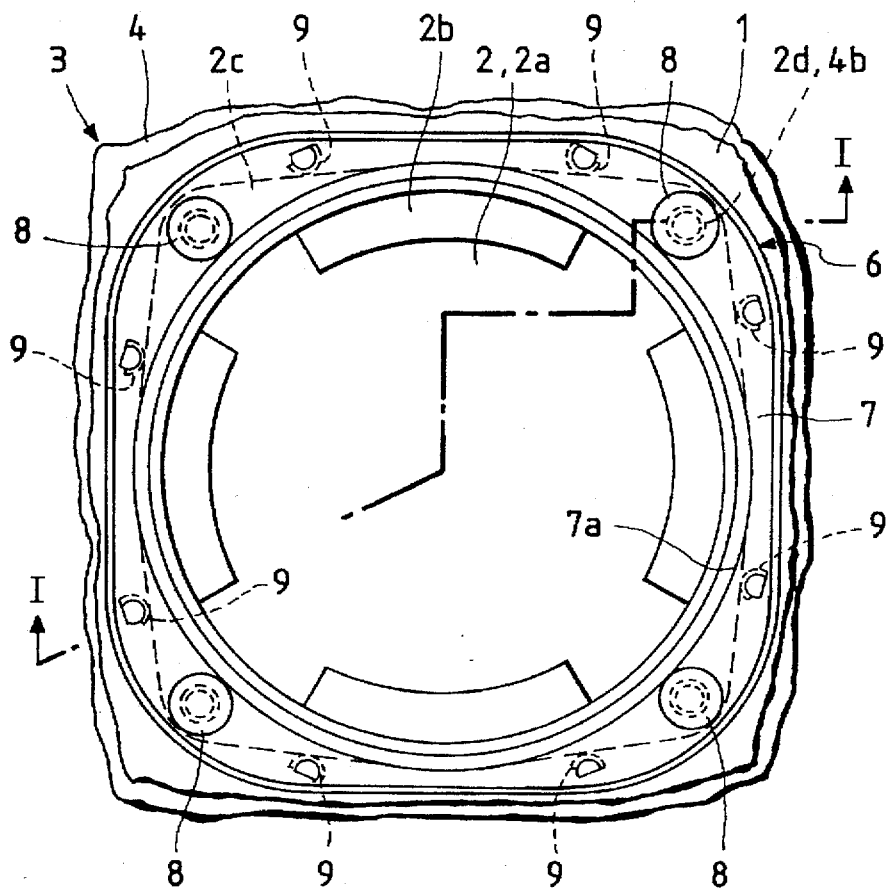
FIG. 2 is a partial plan view of the embodiment, taken along the line II—II of FIG. 1.

An air bag device M according to the present embodiment is to be mounted onto a steering wheel and, as shown in FIGS. 1 and 2, it comprises an air bag 1, an inflator 2, a bag holder 3, a retainer 6, and a pad 11.

The inflator 2 includes a cylindrical main body 2a having a gas discharge opening 2b in the upper portion thereof, and a flange portion 2c which is provided on the outer peripheral surface of the main body 2a and projects substantially in a square shape. The flange portion 2c includes, in the four corners thereof, mounting holes 2d which respectively extend through the corners in the vertical direction thereof.

The bag holder, generally indicated at 3, includes a bottom wall 4 formed of a rectangular board and side walls 5 which respectively extend vertically from the peripheral edge of the bottom wall 4. In the central portion of the bottom wall 4, there is formed a circular opening 4a into which the main body 2a of the inflator 2 can be inserted from below and, in the peripheral edge of the opening 4a, there are formed mounting holes 4b in correspondence to the mounting holes 2d of the flange portion 2c of the inflator 2. Also, in each of the portions of the bottom wall 4 situated between the respective mounting holes 4b, there are formed two securing holes 4c which respectively extend through the portions in the vertical direction thereof.

Also, the pad 11 for covering the periphery of the folded air bag 1 is connected to the respective side walls 5 by use of a plurality of blind rivets 12, bolts or the like which can be assembled from one side thereof.

Further, at the given positions of the bag holder 3, there are arranged nuts and bolts (neither of which are shown) or the like which can be used to mount the air bag device M onto the steering wheel.

The pad 11 includes a covering layer 11a which is formed of synthetic resin and can be broken by the air bag 1 when the air bag is expanded, and an insert 11b which is connected to the side walls 5 of the bag holder 3 in the lower peripheral edge thereof. And, reference character 11c designates a flexible net which is connected to the insert 11b and is embedded in the upper wall of the pad 11.

The air bag 1 is made of woven cloth which is formed of polyester, polyamide or the like, and the air bag 1 is structured such that it can be expanded into a substantially spherical shape if gas is supplied thereto through the gas discharge opening 2b from the inflator 2. And, the air bag 1 is normally folded and stored under the pad 11. In the central portion of the lower portion of the air bag 1, there is formed a circular opening 1a which is used to insert the main body 2a of the inflator 2 and, near the peripheral edge of the opening 1a, there are formed mounting holes 1b and insertion holes 1c in such a manner that they respectively correspond to the mounting holes 4b and securing holes 4c of the bag holder 3.

The retainer 6, which is made of a metal plate, includes a substantially square main body 7 having, in the central portion thereof, an opening 7a for insertion of the main body 2a of the inflator 2, bolts 8 respectively welded to the four corners of the main body 7 at the positions corresponding to the mounting holes 1b of the air bag 1, and securing projections 9 which are respectively disposed at positions corresponding to the insertion holes 1c of the air bag 1 and which extend downwardly.

The bolts 8 cooperate with nuts 10 in forming fixing means which are used to unite the inflator 2, bag holder 3, retainer 6 and air bag 1 together into an integral body.

Each of the securing projections 9, as shown in FIGS. 1–4, is formed by cutting a portion of the main body 7 and raising the cut portion from the main body 7, by press machining, into a semi-cylindrical shape with a peripheral wall 9a raised from the retainer and a semi-arc shaped outer peripheral surface of the peripheral wall faces the opening 1a of the air bag 1, that is, on the central side of the opening 7a of the main body 7. Thus, the outer surface 9e of the securing projection faces the opening 1a.

As described above, in the retainer 6 according to the present embodiment, each of the securing projections 9 is not formed by a drawing operation, but is formed by cutting a portion of the main body 7 of the retainer 6 and then raising the cut portion from the main body 7. That is, the securing projection 9 can be formed from the main body 7 of the retainer 6 simply by press machining which requires only a small quantity of machining energy. This can reduce the manufacturing cost of the retainer 6 and thus can contribute to the reduction of the manufacturing cost of the air bag device M and, at the same time, can prevent the formation of the securing projections 9 from having ill effects on the dimensions and shapes of the neighboring portions of the securing projections 9.

Figure 3:
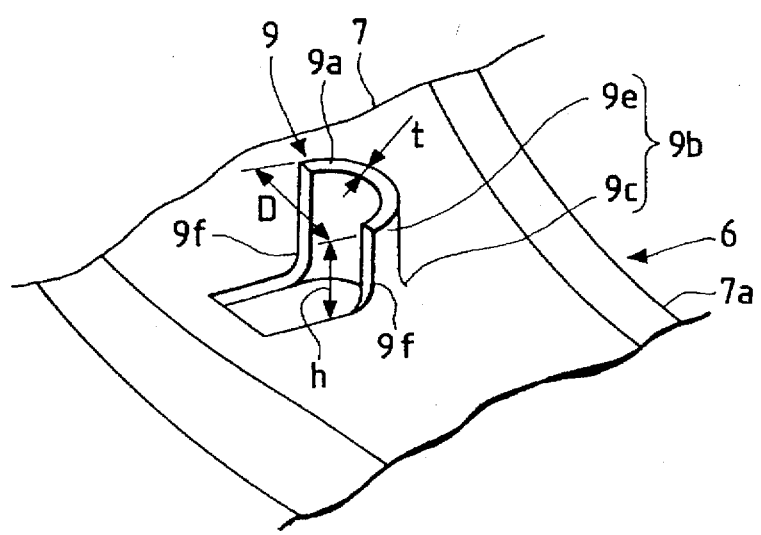
FIG. 3 is a perspective view of a securing projection provided in a retainer employed in the embodiment, viewed from a bottom surface side of the retainer.
Figure 5:
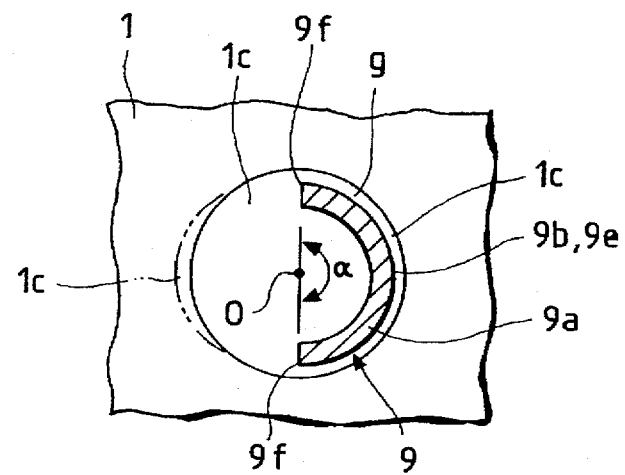
FIG. 5 is an enlarged transverse sectional view of the embodiment, taken along the line V—V shown of FIG. 4.

Each of the securing projections 9 is preferably formed such that, as shown in FIG. 5, an angle $\alpha$ from the central point O of the peripheral wall $9a$ to the edges of the wall $9a$ is equal to or greater than 180° in order to prevent the edge $9f$ thereof from forming any angle with respect to the inner peripheral surface of the insertion hole $1c$ of the air bag when they come into contact with each other. And, in the present embodiment, as shown in FIG. 3, each of the securing projections 9 is formed in a semi-cylindrical shape having a thickness t of 0.5 mm and an outside diameter D of 5 mm, while each securing projection 9 projects from the retainer main body 7 with a height h of 4.5 mm. On the other hand, the insertion holes $1c$ and the securing holes $4c$ of the air bag 1 and bag holder bottom wall 4 respectively have a diameter of 5.5 mm which is larger than the outside diameter of the peripheral wall $9a$ and slightly smaller than the outside diameter (7 mm) of the upper portion of an arc surface $9c$ to be described later, so that the securing projection 9 can be inserted easily.

Figure 4:
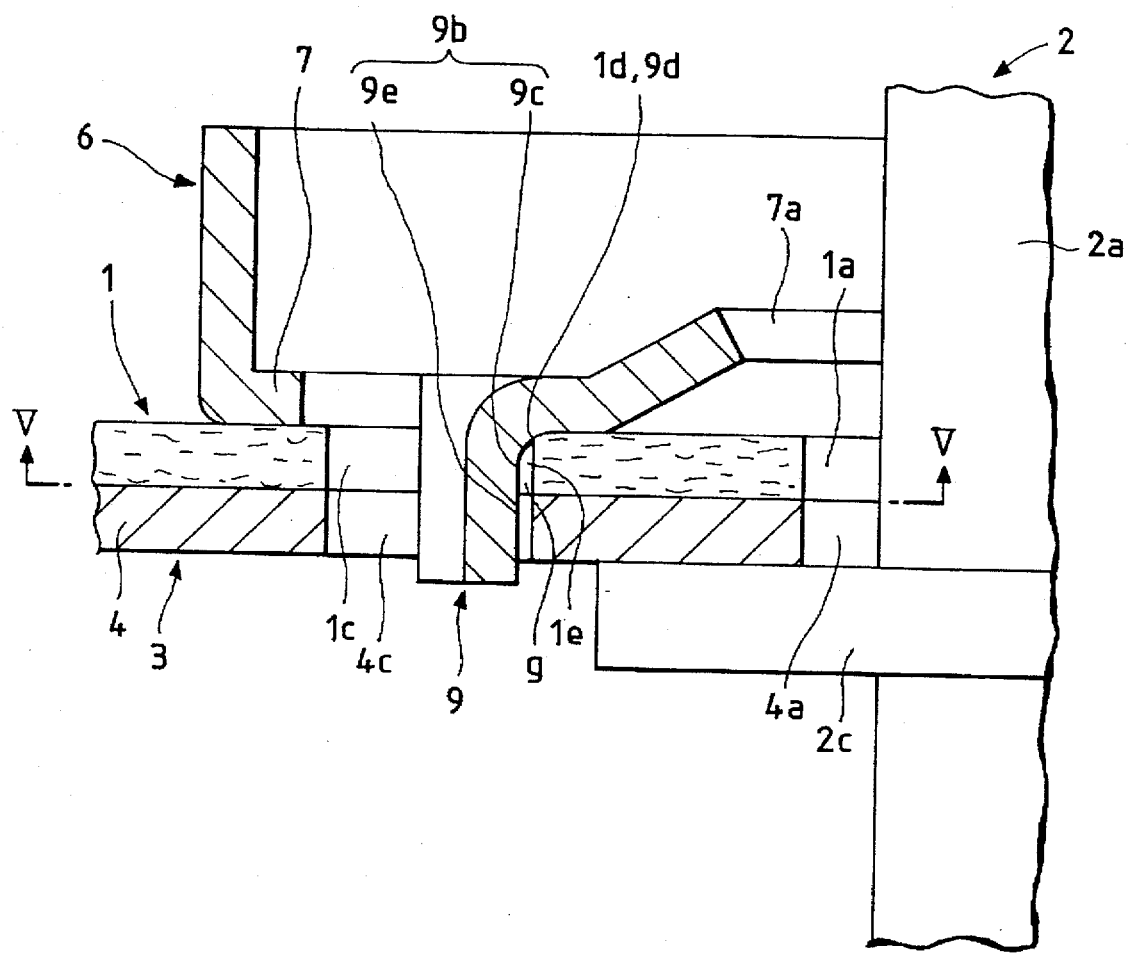
FIG. 4 is an enlarged partial longitudinal sectional view of the embodiment showing the securing projection engaged with the bag holder.

Also, as shown in FIGS. 3 and 4, the inside surface of the base portion of the securing projection 9 on the retainer main body 7 side is formed in an arc surface $9c$ which is a section obtained when the securing projection 9 is cut and extends in the projecting direction thereof. For reference, in the present embodiment, the arc surface $9c$ is set for 1R.

Referring now to assembling of the air bag device M, at first, the retainer 6 is inserted through the opening $1a$ into the air bag 1 before the air bag 1 is folded, and then the air bag 1 is folded into a given shape. In this operation, the bolts 8 and securing projections 9 of the retainer 6 are respectively inserted into the mounting holes $1b$ and insertion holes $1c$ of the air bag 1.

Thereafter, the bag holder 3 is placed in the peripheral edge of the opening $1a$ formed in the lower surface of the air bag 1. In this operation, the bolts 8 and securing projections 9 of the retainer 6 are respectively inserted into the mounting holes $4b$ and securing holes $4c$ of the bag holder bottom wall 4.

And, the main body $2a$ of the inflator 2 is inserted into the openings $4a$, $1a$ and $7a$ of the bag holder bottom wall 4, air bag 1 and retainer main body 7 from below, the bolts 8 extending from the retainer 6 are respectively inserted into the mounting holes $2d$ of the flange $2c$ of the inflator 2, and the nuts 10 are respectively fastened to the bolts 8 on the lower side of the flange $2c$.

Next, the lower portion of the insert $11b$ of the pad 11 is connected to the side wall 5 of the bag holder 3 by use of a blind rivet 12, and the air bag device M is assembled.

After completion of the assembling operation of the air bag device M, the air bag device M may be mounted onto a given steering wheel by use of nuts (not shown) or the like which are provided in the bag holder 3.

And, when, as the occasion demands, gas is discharged from the gas discharge opening $2b$ into the air bag 1 so that the air bag 1 is caused to break the upper wall of the pad 11 and fill the air bag 1, a tensile force is applied to the peripheral edge of the opening $1a$ of the air bag 1 in the horizontal direction which extends outwardly in the radial direction. In the present embodiment, the bolts 8 and securing projections 9 can withstand this tensile force.

In this case, since each of the securing projections is formed in a semi-cylindrical shape with the peripheral wall $9a$ thereof situated so as to face the opening $1a$ of the air bag 1, the outer peripheral surfaces $9b$ of the semi-arc-shaped peripheral walls $9a$ of the respective securing projections 9 are brought into contact with the inner peripheral surfaces of the insertion holes $1c$ of the air bag 1, thereby preventing the strong contact of the edges $9f$ of the securing projections with the inner peripheral surfaces of the insertion holes $1c$ of the air bag 1. This in turn can prevent cracks from occurring in the inner peripheral surfaces of the insertion holes $1a$ of the air bag 1.

And, especially, in the present embodiment, since the inside surface of the base portion of each of the securing projections 9 on the retainer main body 7 side is formed in the arc surface $9c$ which is a section thereof obtained when the securing projection 9 is cut in the projecting direction thereof, as shown in FIGS. 4 and 5, in assembling, the upper ends $1d$ of the inner peripheral surfaces of the insertion holes $1c$ of the air bag 1 are respectively brought into contact with the upper portions $9d$ of the arc surfaces $9c$. This generates gaps g between the portions $1e$ of the inner peripheral surfaces of the insertion holes $1c$, situated downwardly of the upper ends $1d$, and the surfaces $9e$ of the outer peripheral surfaces $9b$ of the peripheral walls $9a$ of the securing projections 9, situated downwardly of the upper portions $9d$ of the arc surfaces.

Therefore, when the air bag 1 is expanded, even if the tensile force is applied to the peripheral edge of the opening $1a$ of the air bag 1 in the horizontal direction, that is, outwardly in the radial direction, the gaps g cannot disappear completely due to the fastening forces of the bolts 8 and nuts 9. This makes it difficult for the lower side portions $1e$ of the inner peripheral surfaces of the insertion holes $1c$ to come into contact with the lower surfaces $9e$ of the outer peripheral surfaces $9b$ of the peripheral walls $9a$ of the securing projections 9 situated downwardly of the upper portions $9d$ of the arc surfaces. This prevents the lower side portions $1e$ of the inner peripheral surfaces of the insertion holes $1c$ from coming into contact with the edges $9f$, thereby preventing cracks from occurring in the inner peripheral surfaces of the insertion holes $1c$ of the air bag 1 when the air bag is expanded.

In the present embodiment, the number of the securing projections 9 provided in the retainer 6 is set at eight. However, this is not a limit and the number of the securing projections 9 may be increased or decreased according to the tensile forces produced when the air bag 1 is expanded.

Also, in the present embodiment, there is illustrated a case in which the number of the bolts 8 employed as the fixing means provided in the retainer 6 is set at four. However, the invention is not limited to this but, if the inflator 2 and the like can be united together into an integral body, then the number of the bolts 8 may be decreased down to two or three. Further, besides the bolts 8 and nuts 10, rivets may also be used as the fixing means.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. An air bag device comprising:

a bag holder having securing holes therein;

an air bag having an opening therein and insertion holes extending through said air bag near a peripheral edge of said opening, said securing holes being aligned with said insertion holes; and a retainer having a plurality of securing projections, each of said securing projections being inserted through an associated said insertion hole and into an associated said securing hole, each if said securing projection being of a semi-cylindrical shape having a peripheral wall which is cut and raised from a surface of said retainer, an outer surface of said peripheral wall of each said securing projection facing said opening.

2. An air bag device as set forth in claim 1, wherein said securing projections are formed in a main body of said retainer and each securing projection has a base portion, and a surface of the base portion of each of said securing projections is formed so as to have an arc surface in a portion which extends in a projecting direction of said securing projection.

3. An air bag device as set forth in claim 2, wherein diameters of each said securing hole and each said insertion hole are larger than an outside diameter of each said securing projection and a diameter of said base portion is larger than the diameters of said securing hole and insertion hole.

4. An air bag device as set forth in claim 1, wherein said peripheral wall has a pair of edges, said edges being disposed at least 180° apart.

5. An air bag device as set forth in claim 1, wherein a gap is formed between said outer surface of said peripheral wall and an inner peripheral surface of said insertion hole.

* * * * *